United States Patent [19]

Takenouchi et al.

[11] Patent Number: 4,506,111
[45] Date of Patent: Mar. 19, 1985

[54] TEXT MAILING SYSTEM USING A TELEPHONE LINE

[75] Inventors: Hiroo Takenouchi, Machida; Hideaki Ishida, Kawasaki; Kunio Hiyama, Fujisawa, all of Japan

[73] Assignee: Hitachi, Ltd., Tokyo, Japan

[21] Appl. No.: 415,453

[22] Filed: Sep. 7, 1982

[30] Foreign Application Priority Data

Sep. 4, 1981 [JP] Japan ................................. 56-139272

[51] Int. Cl.³ .......................................... H04M 11/00
[52] U.S. Cl. .................................. 179/2 A; 179/2 R; 179/2 DP
[58] Field of Search ................... 179/2 R, 2 A, 2 DP; 178/4.1 R, 4.1 B; 358/256, 259, 85, 86

[56] References Cited

U.S. PATENT DOCUMENTS 3,397,287  8/1968  Ishii et al. ........................... 179/2 R
3,728,486  4/1973  Kraus ................................... 179/2 R

OTHER PUBLICATIONS

*Electronics*, Jan. 18, 1979, pp. 68, 70, "Facsimile and Voice System Links Office".

*Primary Examiner*—Thomas W. Brown
*Assistant Examiner*—W. J. Brady
*Attorney, Agent, or Firm*—Antonelli, Terry & Wands

[57] ABSTRACT

A text mailing system comprises a plurality of terminal equipments each connected to a telephone set to input and output a message and a mail control unit for receiving the messages from the terminal equipments through an exchanger and transmitting the received messages to the terminal equipments specified by the messages. Each of the terminal equipments inputs addressee identification information and the mail control unit transmits the messages to the terminal equipments on the condition of inputs of the addressee identification information for a specified type of message.

10 Claims, 29 Drawing Figures

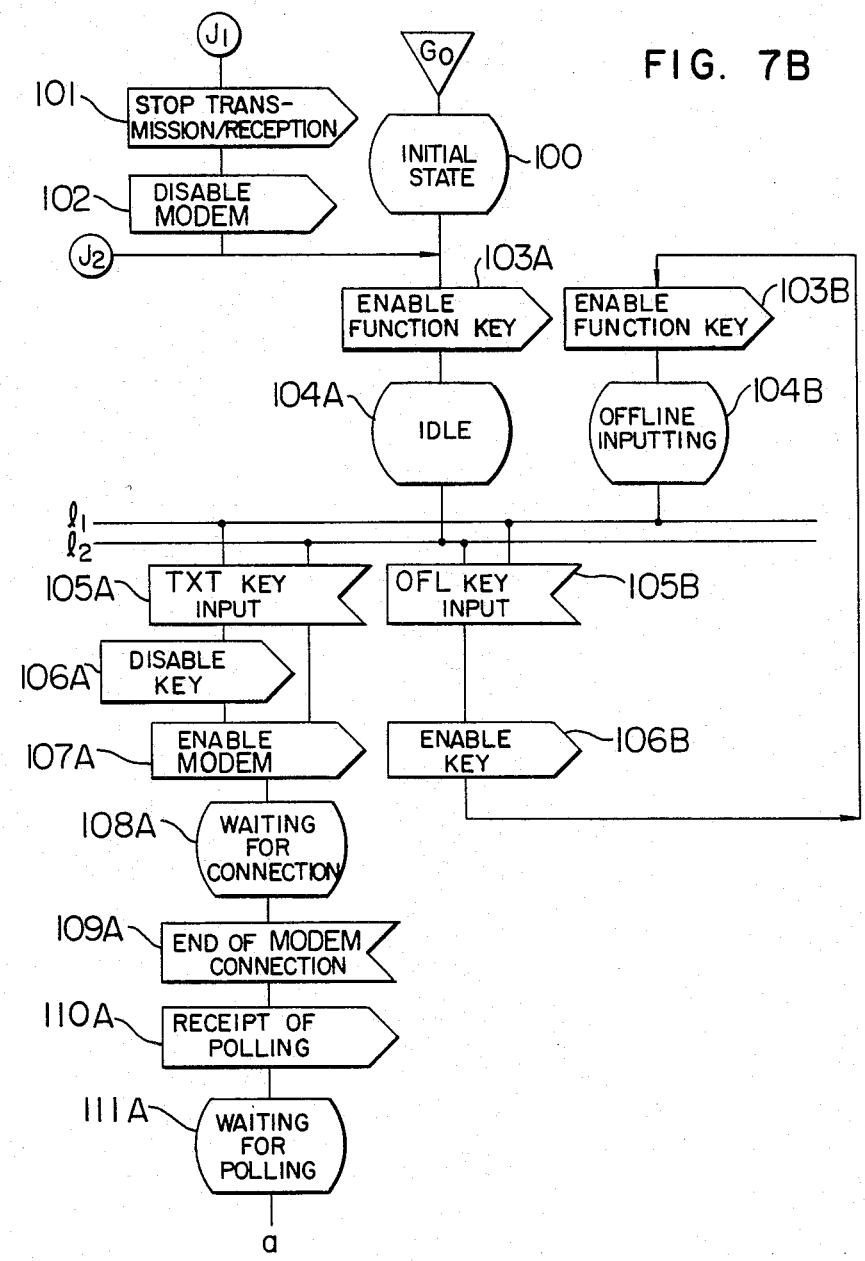

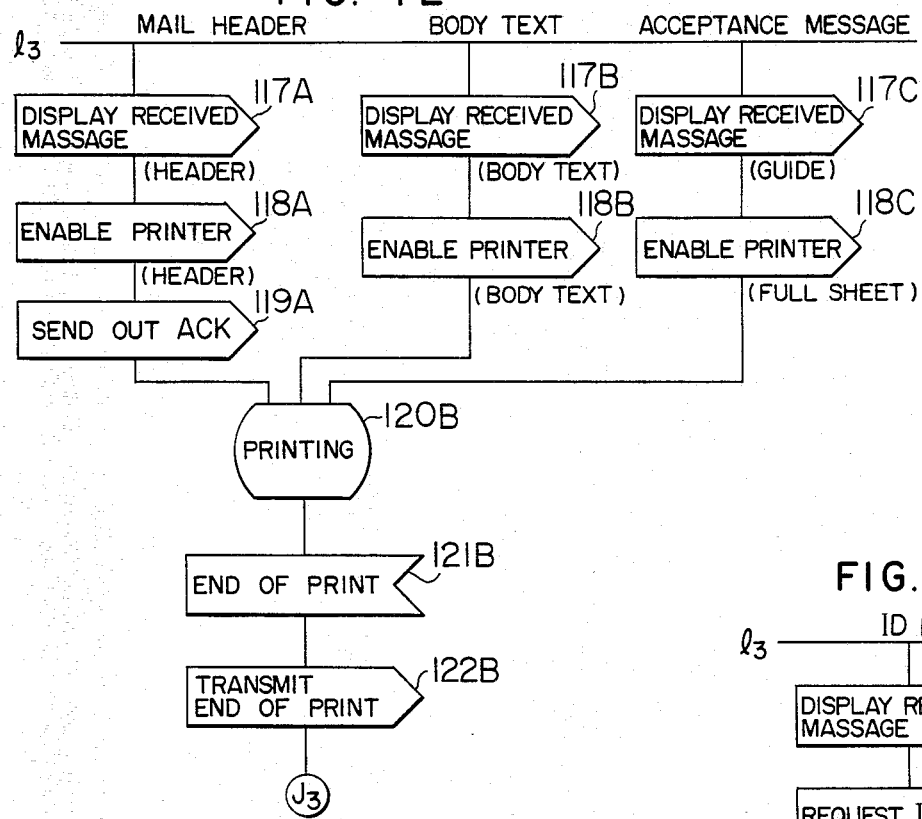
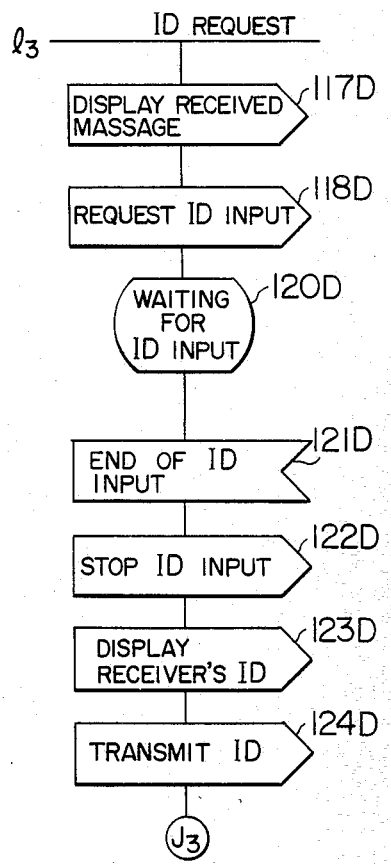
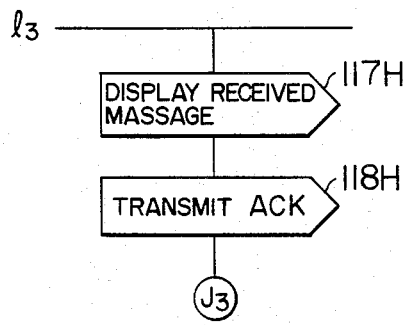

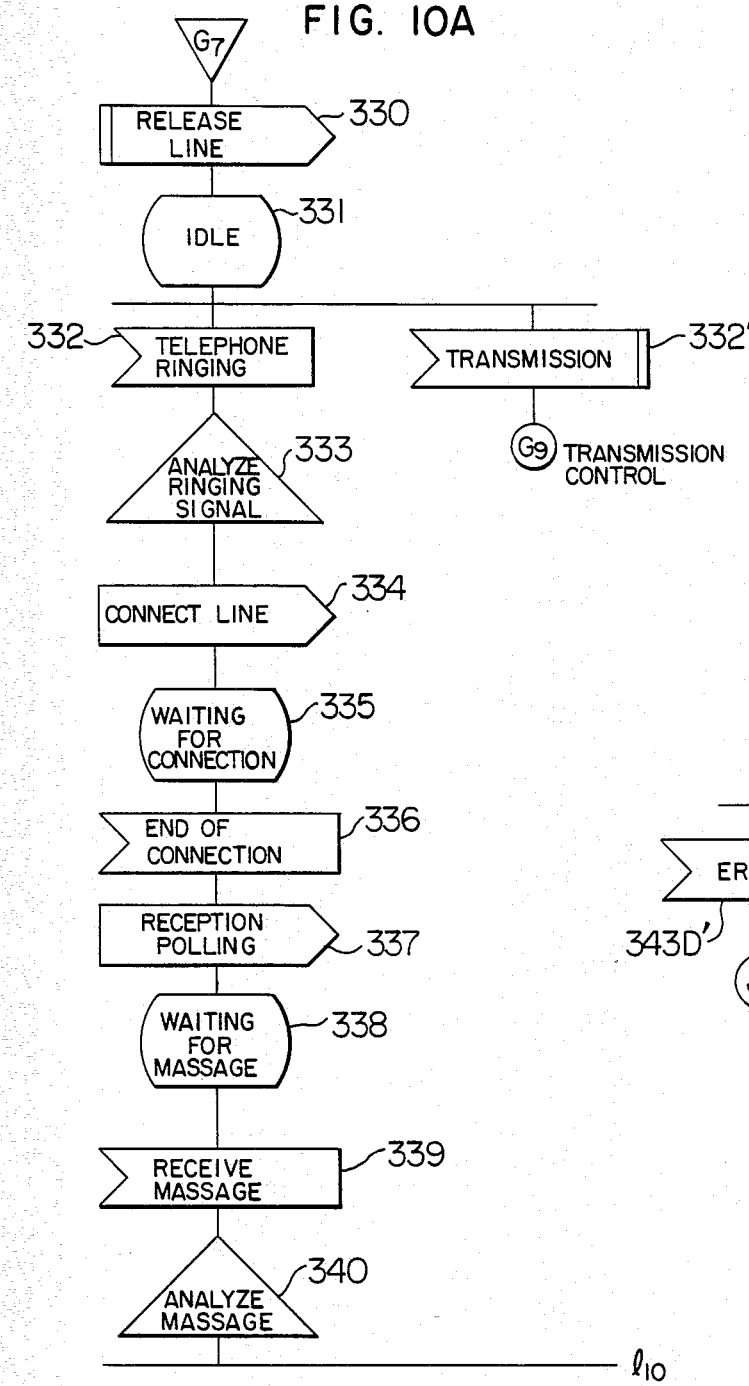
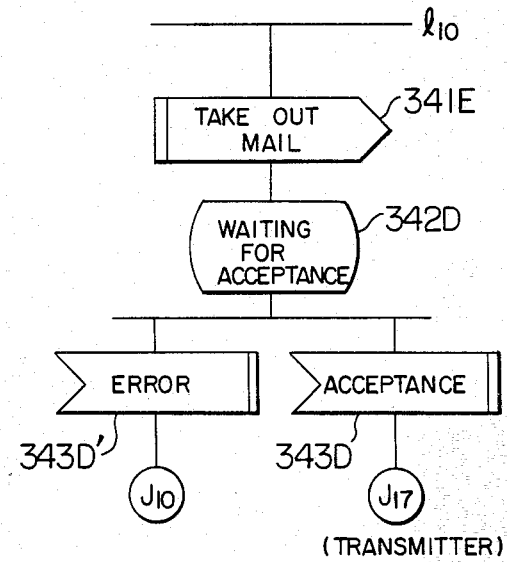
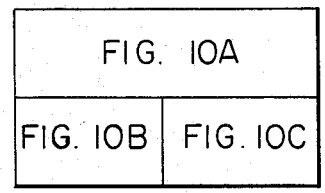

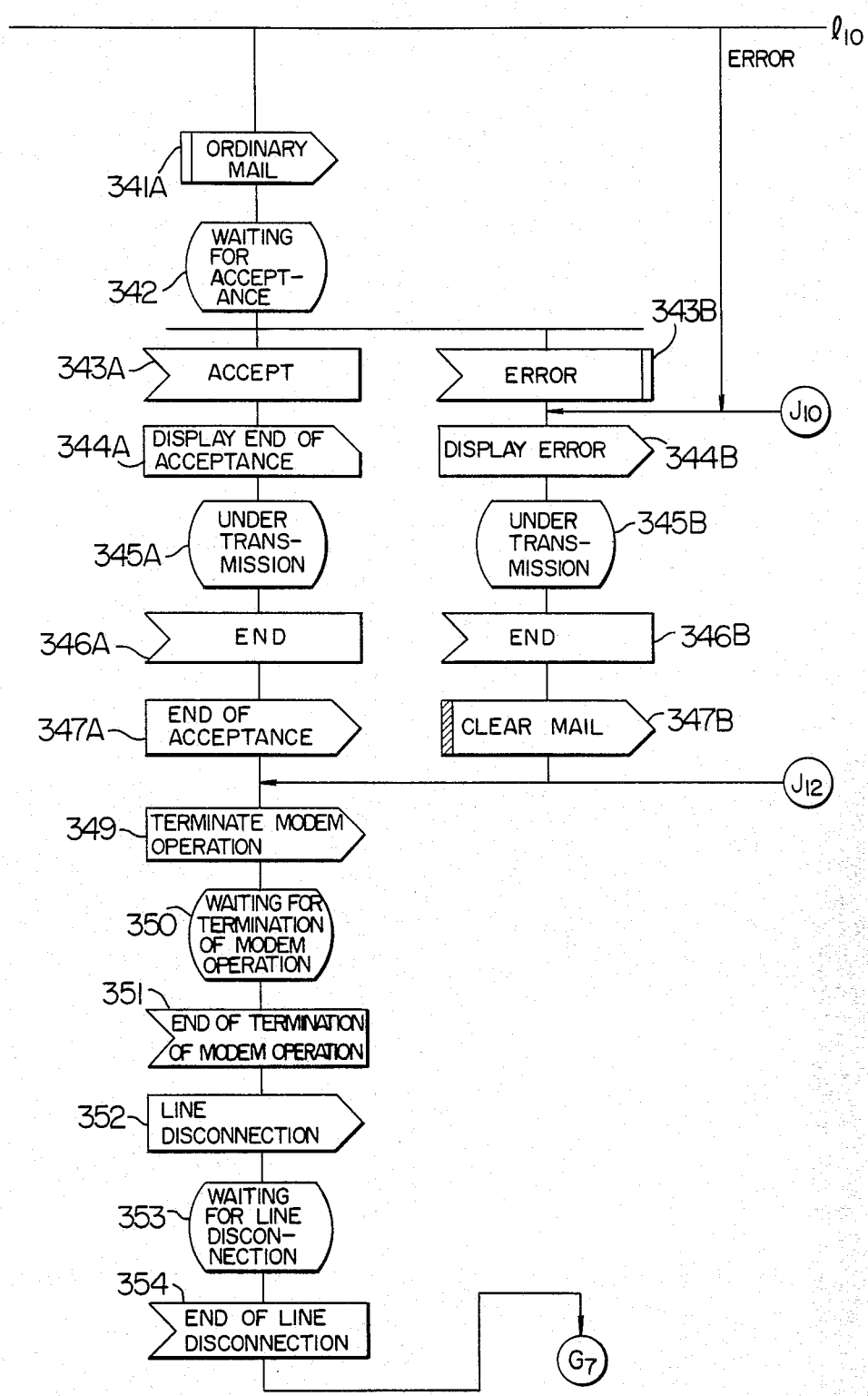

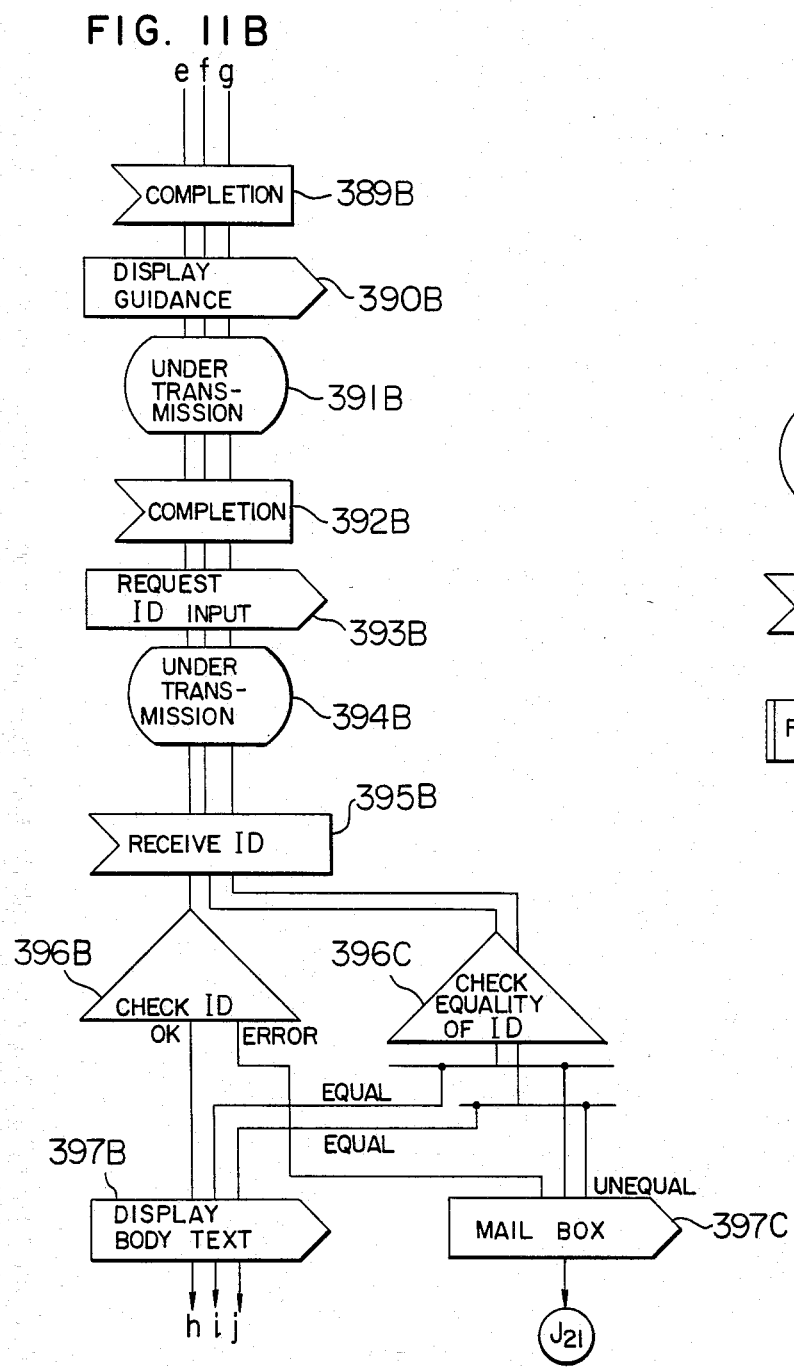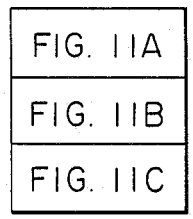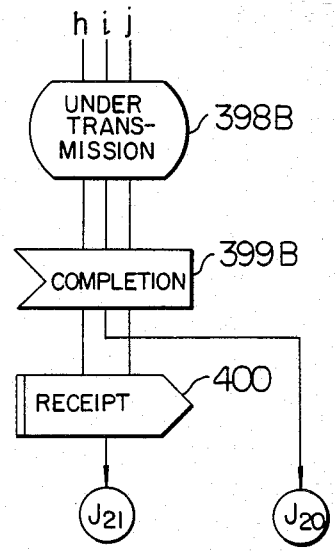

TEXT MAILING SYSTEM USING A TELEPHONE LINE

BACKGROUND OF THE INVENTION

1. Field of the Invention

The present invention relates to a text mailing system, and more particularly to a text mailing system in which a message is inputted from terminal equipment connected to a telephone set and the message is transmitted to a receiving station by utilizing a telephone line.

2. Description of the Prior Art

The telephone is a most common communication means in an office, but when an addressee station is busy or nobody is present there, it is necessary to redial again and again until the communication is established, if an emergency communication is required. When a person with whom the communication is desired is absent and another person answers, the purpose of communication is not achieved if the content of the communication is a confidential matter which cannot be left to a third person. When it is desired to communicate an identical matter to a plurality of persons, such as a notice of holding a meeting, the above problems are encountered for the plurality of persons when conventional telephones are used.

SUMMARY OF THE INVENTION

It is an object of the present invention to provide a text mailing system in which terminal equipment for inputting and outputting messages is connected to each telephone line to branch from a telephone set, a mail controller included in a central station having a specific telephone number is called from the telephone set or the terminal equipment, and a message prepared by the terminal equipment is transmitted to an addressee terminal equipment through the mail controller.

In accordance with the present invention, because of the intervention of the mail controller, the communication of information can be completed without redialing even if the addressee station is busy or the addressee is absent, and the addressee can later get the information not communicated because of the busy condition or absence by inquiring to the mail controller. If a plurality of addressees are specified by the terminal equipment, the messages of the same content for respective addressees are prepared by the mail controller so that the same message can be transmitted to the plurality of addressees. For a message of a special content, an addressor specifies a type of message to select a function of registered mail, personal mail or registered personal mail in which the content of the message is outputted on the condition of an input with an addressee's ID or check of an input ID. The present system can also issue a receipt for the registered mail or the personal mail. It is also possible, by utilizing the function of the mail controller, to refer to a common expression, specify an addressee by an abbreviation code and provide information service on a reservation status of a conference room. The present system can be connected to a computer.

A conventional text mailing system needs a special network, or it needs a special communication controller in order to use the telephone network. On the other hand, the present system can be directly connected to the existing telephone line without loss of the telephone function.

BRIEF DESCRIPTION OF THE DRAWINGS

FIGS. 7A-7G show details of the blocks shown in FIG. 6;

FIGS. 10A-12E show details of the blocks shown in FIG. 9.

DESCRIPTION OF THE PREFERRED EMBODIMENTS

Figure 1:
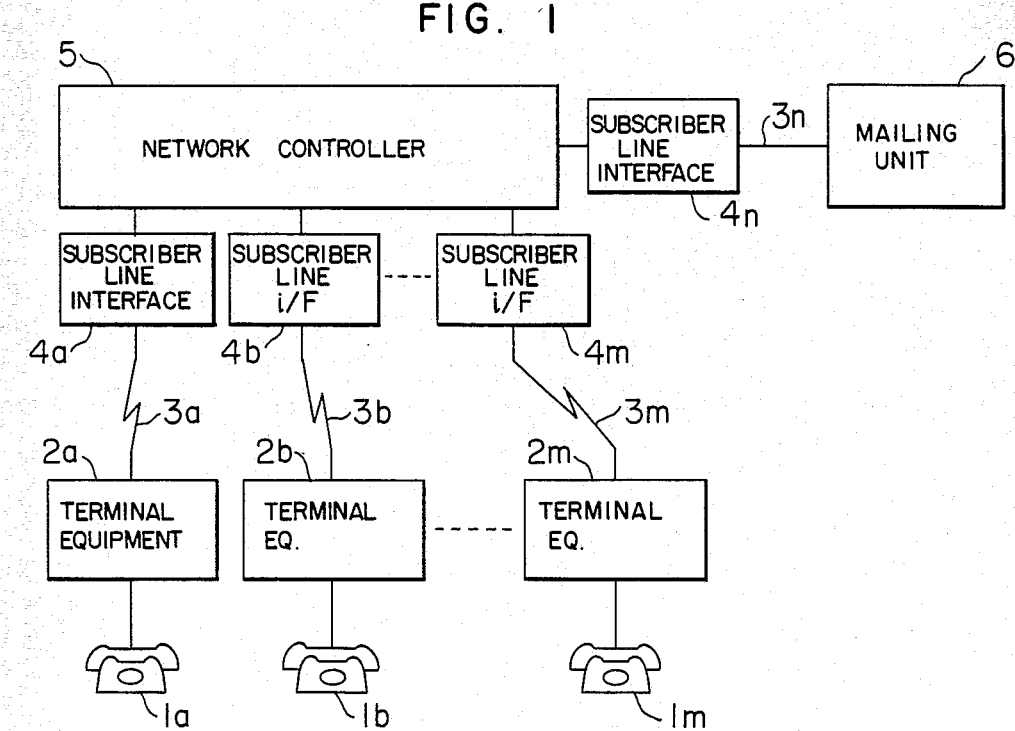
FIG. 1 shows an overall configuration of one embodiment of a text mailing system of the present invention.

FIG. 1 shows an overall configuration of a text mailing system of the present invention. Numerals 1 (1a, 1b, . . . ) denote telephone sets, numerals 2 (2a, 2b, . . . ) denote terminal equipments, numeral 3 (3a, 3b, . . . ) denote telephone lines, numerals 4 (4a, 4b, . . . ) denote subscriber line interface circuits at an exchanger, numeral 5 denotes a network controller constituting the exchanger, and numeral 6 denotes a mailing unit connected to the network controller 5 through a subscriber line interface 4n. The mailing unit 6 is assigned with its own telephone number like the subscriber's telephone sets 1a, 1b, . . . . A subscriber who wants to send a message first enters the message through his or her own terminal equipment 2a or 2b, . . . , calls the mailing unit 6 by an auto-dialing function contained in the telephone set 1a or 1b . . . or the terminal equipment 2a or 2b . . . , and, after the connection with the mailing unit 6 has been confirmed, performs the operation for message transmission. As will be described later, the message specifies an addressee by a telephone number of the addressee. It is temporarily stored in the mailing unit 6 and then sent to the terminal equipment connected to the addressee's telephone line.

Figure 2:
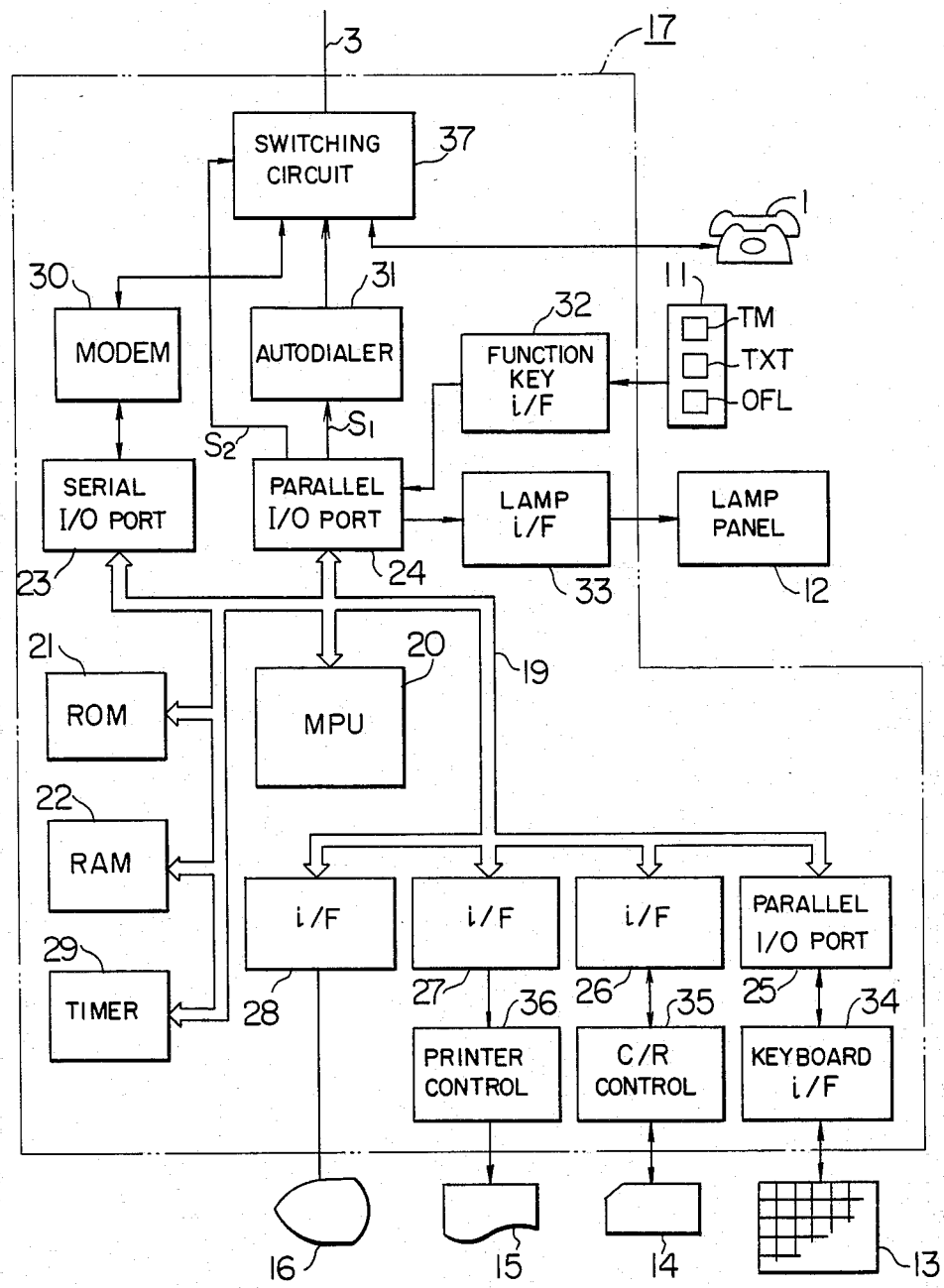
FIG. 2 shows a block diagram of a terminal equipment 2 in the system of FIG. 1.

FIG. 2 shows a specific construction of the terminal equipment 2 (2a, 2b, . . . ). It comprises a function key keyboard 11, a lamp panel 12 for indicating an operation status of the equipment, a keyboard 13 for entering a message, a magnetic card reader 14, a display 16 for displaying a transmitting message and a received message, a printer 15 for producing a hard copy of the message displayed on the display 16, and a controller 17 for controlling those units. The function key keyboard 11 has three keys TM, TXT and OFL for controlling the operation of the terminal equipment 2. The key TM is used to automatically generate a dialing signal for calling the mailing unit 6, the key TXT is used to start message transmission/reception operation, and the key OFL is used to enable the keyboard 13, the magnetic card reader 14 and the display 16 in order to prepare a message.

The controller 17 comprises an 8-bit microprocessor (MPU) 20 such as Hitachi HMCS-6800, a read-only memory (ROM) 21 which stores programs for controlling the operation of the MPU 20 and fixed data, a random access memory (RAM) 22 for storing various data, a serial I/O port 23, parallel I/O ports 24 and 25, interface circuits 26, 27 and 28, a timer 29 and an information bus 19 for interconnecting those units. The serial I/O port 23 is connected to a MODEM 30 for modulating and demodulating signals to transmit and receive message data through the telephone line 3. The parallel I/O port 24 is connected to an auto-dialer 31, a function key interface circuit 32 and a lamp panel interface circuit 33, and it receives inputs from the function key 11 and provides control signals to the auto-dialer 31 and the lamp panel 12. The auto-dialer 31 is a kind of relay circuit which responds to a control signal $S_1$ supplied from the processor 20 under a program control to turn on and off relays to generate a dialing signal corresponding to the telephone number of the mailing unit 6. The parallel I/O port 25 is connected to the keyboard interface circuit 34. The interface circuits 26 and 27 are connected to a magnetic card reader control circuit 35 and a printer control circuit 36, respectively. Numeral 37 denotes a switching circuit which is controlled by a control signal $S_2$ from the parallel I/O port 24. It selects the connection of the telephone line 3 to the telephone set 1 and the MODEM 30.

Figure 3:
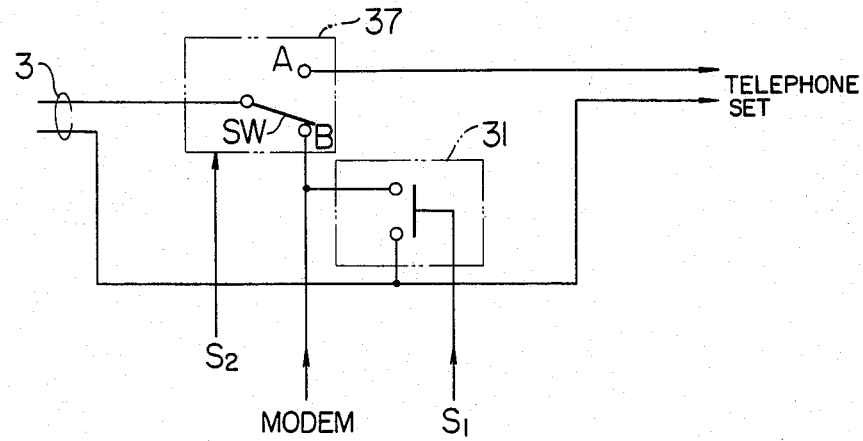
FIG. 3 shows circuit diagrams of a switching circuit 37 and an auto-dialer 31.

FIG. 3 shows the connection between the switching circuit 37 and the MODEM 30 and the auto-dialer 31. Normally, a switch SW of the switching circuit 37 is set to a terminal A so that the telephone line is connected to the telephone set 1. When a power supply of the terminal equipment 2 is turned on and the function key TXT is depressed, the switch SW is switched to a MODEM position (terminal B) by the control signal $S_2$, and it is returned to the telephone set position after the message transmission/reception. When the function key TM is depressed, the switch SW is switched to the terminal B and the dialing signal from the auto-dialer 31 is sent out to the telephone line 3 by the control signal $S_1$.

Figure 4:
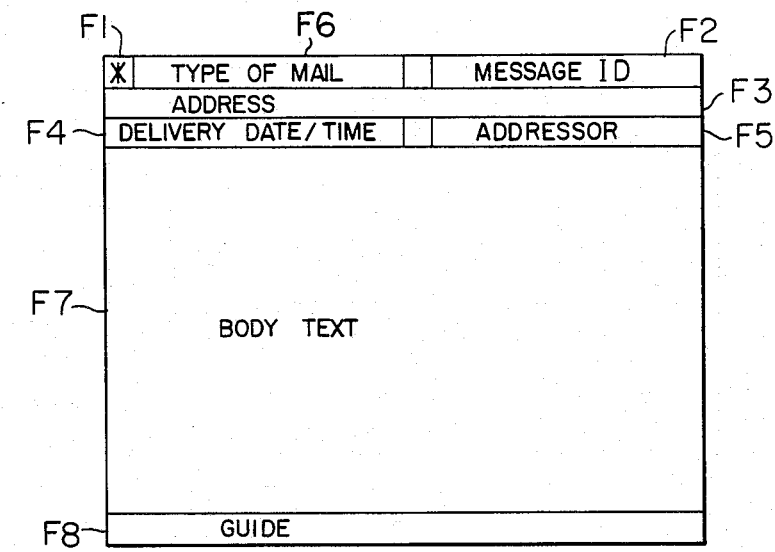
FIG. 4 shows formats of a text and a display screen.

FIG. 4 shows a message format of a transmitting mail prepard by the manipulation of the keyboard 13 and a received mail from the mailing unit 6. F1 denotes a stamp field in which a space character is printed in the transmission mode and a character * is printed in the reception mode. F2 denotes a message ID field in which an addressor specifies an ID by numerals or characters in order to confirm a reception message for registered mail. F3 denotes an address field in which a combination of a telephone number of an addressee and an ID (for example, name) is specified. When it is desired to transmit one message to a plurality of addressees, the respective addresses are entered in the column F3 with punctuation by commas. Alternatively, a predetermined abbreviation for the plural addresses surrounded by ( ) may be entered so that the multi-address mail is transmitted to respective ones corresponding to those specified by the abbreviation. F4 denotes a delivery data/time field. When the addressor wants to specify a delivery data/time, he or she enters the desired data/time in the field F4. If there is no data/time specification in the field F4, the mail is delivered immediately. F5 denotes an addressor field in which a telephone number of the addressor and an ID (for example, name) of the addressor are entered. The fields F1-F6 are collectively referred to as header fields. F7 denotes a body text area in which a message to be transmitted is described. F8 denotes a guide area in which a response from the mailing unit at a central station or an operation guidance is indicated during the message transmission/reception. For example, when the transmitted message is received by the mailing unit 6, a data/time of completion of reception is indicated in the guide area F8, and if a message including an error was transmitted, a guide message indicating the error is indicated. When an ID card input by the addressee is required to output the message as provided for registered mail, a guidance such as "Insert ID card" is indicated to the addressee. Usually, the ID card has a magnetic record of information representing the telephone number and the personal ID of the user in order to allow correlation to the address.

A method for operating the terminal equipment is now explained.

1. Use as a telephone set:

When a power switch of the terminal equipment is off or when the power switch is on but the data transmission/reception is not being carried out, the telephone set can be used for a normal telephone conversation because the switching circuit 37 connects the telephone line 3 to the telephone set 1.

2. Transmission of a message:

The power switch of the terminal equipment 2 is turned on and the off-line key OFL is depressed. Then, the OFL lamp on the lamp panel 12 is lit and a cursor is displayed at a home position on the display 16 to permit the use of the keyboard 13 and the display of the input information on the display screen. When a character key on the keyboard 13 is depressed, the corresponding character is displayed at the cursor position on the display screen and the cursor is shifted to the next character display position. In this manner, predetermined character data is sequentially entered to the respective columns by the character keys to edit the header text and the body text. The keyboard 13 includes character keys as well as control keys, of which a clear key is used to clear all data following the cursor position, an insert key is used to insert a line of data, a delete key is used to delete a line of data and a back space (BS) key is used to backspace the cursor position by one character position and clear the character at the cursor position. By inserting the magnetic card into the magnetic card reader 14 during the edition of the mail header, the content recorded on the magnetic card is automatically entered in the addressor field F5.

After the off-line message formation, the mailing unit 6 is next called. This may be carried out by picking up the handset and dialing the telephone number of the mailing unit 6, or picking up the handset and then depressing the call key TM on the function key keyboard 11.

When the line is connected to the mailing unit, the mailing unit sends a signal for accepting the transmission of the message and a special sound is generated from the telephone set. After the special sound has been confirmed, the key TXT on the function key keyboard 11 is depressed. As a result, the transmission of the message being displayed on the display screen is started. When the mailing unit receives the message, the reception time is displayed on the guide area F8 of the display screen and a hard copy of the message is produced by the printer 15. After the key TXT has been depressed, the handset may be replaced. After the hard copy has been produced, the line is automatically switched to the telephone set position to recover the initial state in which the telephone set can be used.

When the mailing unit cannot accept the message for some reason, an error message is displayed on the guide area F8 of the display screen and the line is automatically disconnected. In this case, the message is corrected and then the mailing unit is called again.

3. Reception of a message:

When a bell of the telephone set rings and the handset is picked up the voice of the caller is usually heard through the telephone set. In the case of receiving electronic mail, however, a special sound similar to that in the transmission mode is heard through the telephone set. When the answering party depresses the key TXT, the mail header of the received mail is displayed on the display screen and a hard copy is produced by the printer. For ordinary mail, the content of the body text is also outputted following the mail header. For mail such as registered mail, personal mail or registered personal mail which requires the presentation of the receiver's ID card to output the received mail, a guidance sentence requesting the insertion of the ID card is displayed on the guide area when the mail header has been outputted. For personal mail and registered personal mail, the body text is not outputted unless the content of the inserted ID card and the address are equal.

The received mail is, in some cases, a message consisting on only the mail header such as a reception mail which is a reply to the former transmitted registered mail. In any case, when the transmission of the message from the mailing unit has been completed, the line is automatically disconnected.

4. Inquiry:

In the present system, if the mail such as registered mail or personal mail which requires the presentation of an ID card at the receiving site is not delivered or if no response is made to the call from the mailing unit, the mail is temporarily stored in a mail box for each address provided in the mailing unit and it can be taken out in response to an inquiry from the terminal equipment. In order to inquire of the mailing unit, an inquiry header is prepared in an off-line operation and it is sent to the mailing unit in a similar procedure to that of other sending mail.

If undelivered messages are stored in the mail boxes, those messages are sequentially sent to the terminal equipments in response to the inquiry.

A program for controlling the operation of the terminal equipment 2 is now explained.

When a number of I/O devices are connected to a data processor like the terminal equipments of the present system and a complex control operation is to be executed by the data processor in accordance with the states of the devices, it is effective to use a distributed program structure in which a control program is split into a plurality of sub-programs each of which shares a control operation in a different area. A processing specification of such a multifunction program can be represented in various forms and one function may be achieved by various forms of program. In the following description, a flow chart represented in a distributed status transition system is used to explain the function of the control program of the terminal equipment 2.

Figure 6:
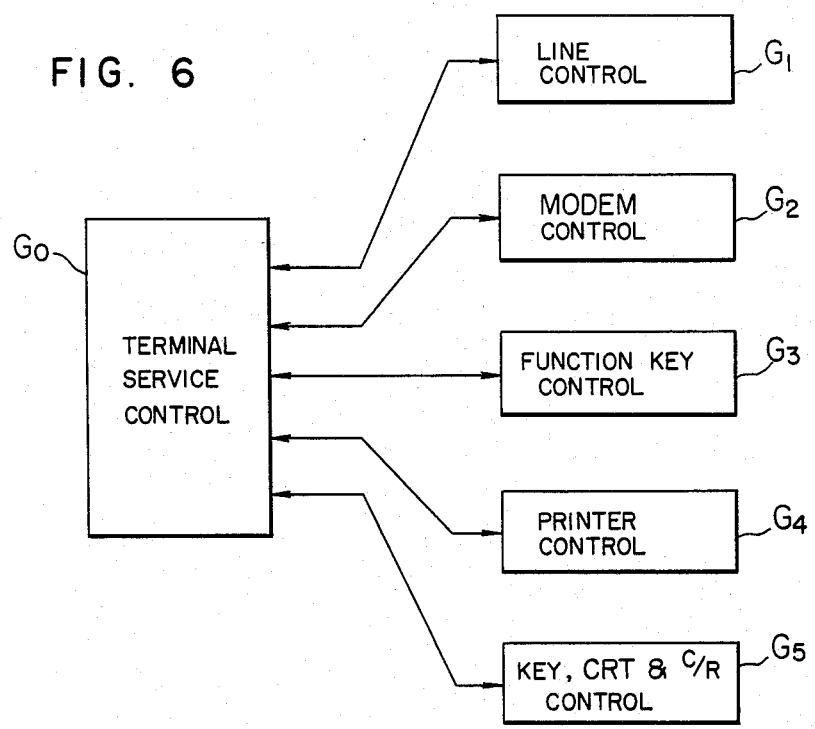
FIG. 6 shows a block diagram of major program blocks for controlling the operation of the terminal equipment 2.
Figure 5A:
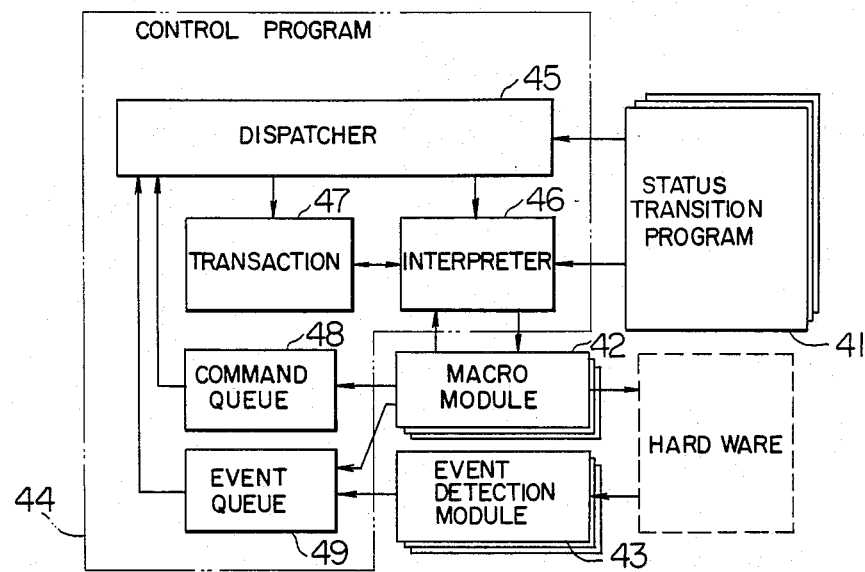
FIGS. 5A and 5B show an overall program configuration and symbols for flow charts for explaining one embodiment of a control program of the present system.

FIG. 5A shows an overall program configuration represented in the distributed status transition system. Numeral 41 denotes a status transition program, numeral 42 denotes a macro module, numeral 43 denotes an event detection module, and numeral 44 denotes a control program for combining those programs. The status transition program 41 is divided into groups depending on control items. For the control of the terminal equipments of the present invention, it is divided, as shown in FIG. 6, into a line control group G1 for controlling the switching circuit 37, a MODEM control group G2 for controlling the data transmission of the mailing unit 6 through the MODEM 30, an FK control group G3 for controlling the function key keyboard 11, a printer control group G4 for controlling the operation of the printer 15, a group G5 for controlling the keyboard 13, the display 16 and the magnetic card reader 14, and a terminal service control group G0 which is in a higher level than other groups and coordinates those groups and operates the terminal equipment 2 in a predetermined sequence.

Figure 5B:
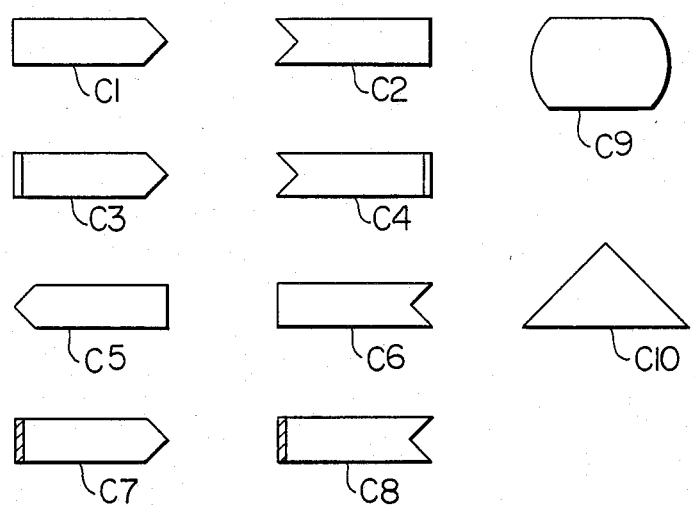

The respective groups of the status transition program exchange information by communicating commands and events or results with each other so that the respective groups transit their states in parallel. In the present embodiment, the flow chart of the status transitions of the respective groups is shown by block symbols C1–C10 shown in FIG. 5B.

The blocks C1 and C3 represent issuance of a command, the blocks C2 and C4 represent reception of a command, the block C5 represents issuance of an event and the block C6 represents reception of an event.

The term command means a command from one status transition group to another status transition group, and the term event means a report of an event (result) from one status transition group to another status transition group. The block symbols C1 and C2 represent the issuance and the reception of the command between a higher level group and a lower level group and the block symbols C3 and C4 represent the issuance and the reception of the command between the same level groups. The block C7 in FIG. 7 represents execution of the macro module.

The term macro means a module which is directly executed and it means the execution of one subroutine. Normally, the macro module controls hardware, as shown in FIG. 5A, and in some cases, it controls software like updating of the content of a data table. It may be accompanied with a parameter corresponding to an argument of the subroutine. The event received by the block C8 is generated by the event detection module 43. The event detection module 43 is started by an interrupt or periodically, and when it detects the event, it registers the corresponding event in an event queue 49 to be described later. The block C9 represents a queue which waits for the reception of the command or event described following the block C9 on the flow chart. When the command or event is received, the blocks following the received block on the flow chart are sequentially executed until a next block C9 is received, when it again waits. The block C10 represents an analysis macro which indicates a branch condition with multiple branch-to addresses.

Referring back to FIG. 5A, the control program 44 comprises a dispatcher 45 and an interpreter 46. The dispatcher 45 selects the highest priority command or event from the command queue 48 on the event queue 49 and reads a transaction 47 which has been waiting for the arrival of that command or event and supplies it to the interpreter 46. The interpreter 46 sequentially interpretes the status transition program until the received transaction transits to the next status, to start the macro module. In this manner, the command or event corresponding to the received transaction is issued and the hardware control is executed. A data format for the command and the event includes a code indicating the type of the command or the event, a pointer to the command or the event and a parameter.

Referring to FIGS. 7A to 7G, details of the groups G0-G5 of the status transition program which governs the operation sequence of the terminal equipment 2 is explained.

As shown in FIGS. 7A-7G, the program of the terminal service group G0 which is in the higher level than the programs G1-G5 issues a command to a lower level group program and then waits for the reception of the event responding thereto. When it receives the event, it issues the next command in accordance with the content of the received event. In this manner, it controls the overall operation of the terminal equipment 2.

For facilitating the understanding of the program, the flow chart for the program G0 is followed for a case where a subscriber prepares a message in the off-line operation and transmits it.

Figure 7C:
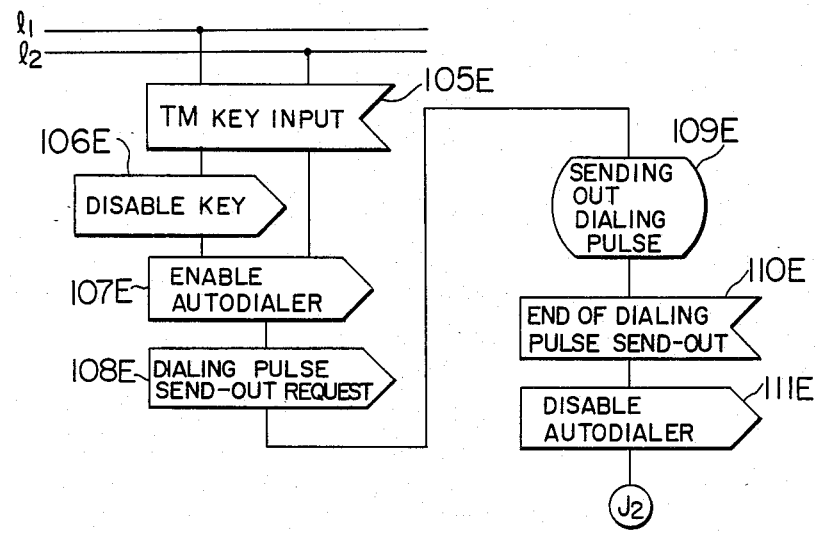
Figure 7D:
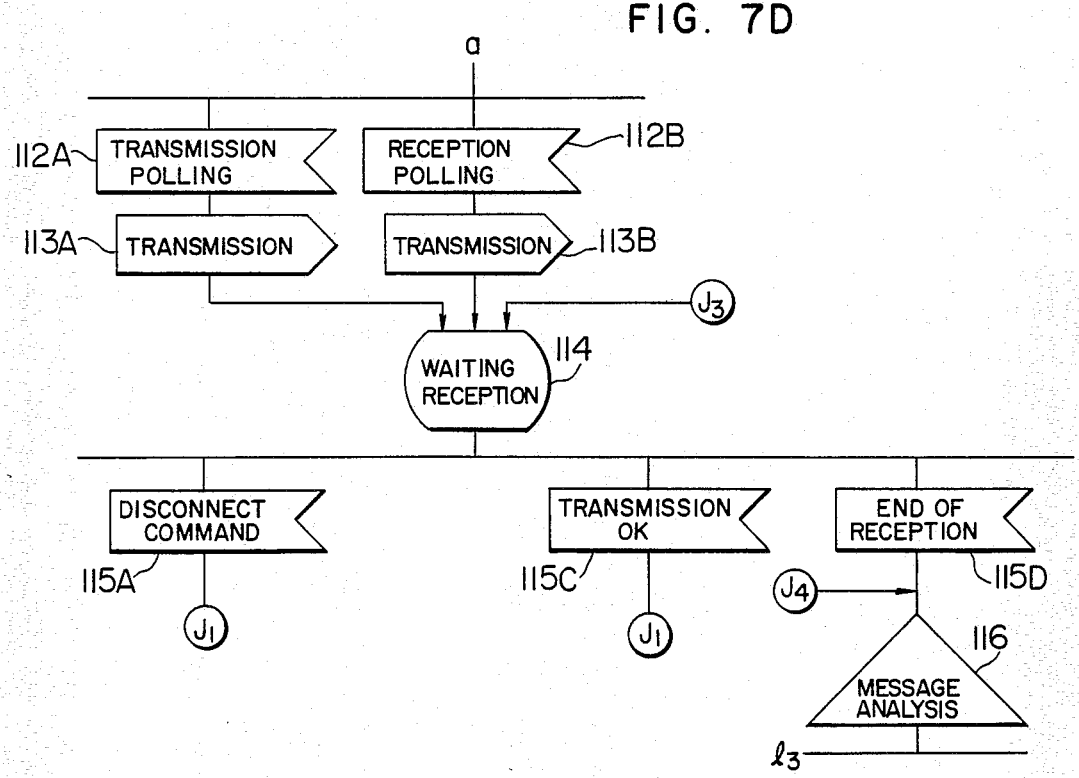

When the subscriber turns on the power switch of the terminal equipment 2, the program G0 starts from an initial state (100), issues a command to enable the function keys to the program G3 (103A), and waits for an idle state (104A). When the function keys are enabled and the subscriber depresses the off-line key OFL, the event of OFL key input is received from the program G3 (105B). Then, the program G0 issues a key enable command to the program G5 (106B) and also issues the function key enable command (103B) and then waits under the off-line input state (104B). When the subscriber composes the message by way of the keyboard 13, picks up the handset to call the mailing unit and then depresses the key TM on the function key keyboard 11 as shown in FIG. 7C, the program G3 issues the event of the TM key input. Accordingly, the program G9 executes a sequence starting from the reception of the TM key input event (105E). The program G0 thus issues a key disable command to the program G5 (106E), issues an auto-dialer enable command and a dialing pulse send request command to the line control program G1 (107E, 108E), and waits for an event of end of dialing pulse send-out in a block 109E. When it receives the end of dialing pulse send-out event from the program G1 (110E), it issues an auto-dialer disable command (111E) and again issues the function key enable command (103A) in FIG. 7B and then waits for next input (104A).

When the terminal equipment 2 is connected to the mailing unit 6 at the central station as shown in FIG. 1 by the generation of the dialing pulse from the auto-dialer, the subscriber listens for the special sound generated by the mailing unit and then depresses the function key TXT. Thus, the program G0 in FIG. 7A now proceeds from the wait status (104A) to the block 105A for receiving the TXT key input event and issues the start command to the line control program G1 (107A) and then waits for the end of MODEM connection (108A). When it receives an end of MODEM connection event (109A), it issues a polling reception command to the MODEM control program G2 (110A) and waits for polling (111A). In the present example, the MODEM detects a transmission polling. Thus, the program G0 receives the transmission polling event (112A) in FIG. 7D and issues a message transmission command (113A) and waits for the reception (114). When the input message from the terminal equipment is acknowledged by the mailing unit, an acknowledge message is sent from the mailing unit to the terminal equipment and the MODEM control program G2 issues an end of reception event (115D). Accordingly, the program G0 proceeds from the reception of the end of reception event (115D) to a message analysis (116). Since the received message is the acknowledge message in the present example, it issues a received message display command to the program G5 (117C), issues a start command to the printer control program G4 (118C) and waits for the end of print (120B) in FIG. 7E. When it receives the end of print event (121B), it issues an end of print send-out command to the MODEM control program G2 (122B) and waits for a disconnection command from the central station (114). When it receives the disconnection command from the central station, it receives a disconnection command event (115A), issues a transmission/reception stop command to the MODEM control program G2 (101), and then issues a MODEM disable command to the line control program G2 (102), issues the function key enable command (103A) and then waits in the idle state (104A).

A procedure for receiving a mail from other subscriber is now explained. When the mailing unit calls the telephone set 1 in FIG. 2 to initiate ringing and the subscriber picks up the handset, the subscriber hears the special sound indicating reception of mail. Then, the subscriber turns on the power switch of the terminal equipment and depresses the function key TXT on the keyboard 11. The program G0 thus proceeds from the idle state (104A) to the blocks 105A, 106A, ... 111A where it waits for polling. Since the MODEM control program G2 issues the reception polling event, the program G0 issues an acknowledgement (ACK) send-out command (113B) and then waits for the reception (114). When the reception at the modem has been completed, the program G0 receives the end of reception event (115D) and analyzes the message. Since the first received message is the mail header, the program G0 sequentially issues a header display command (117A) and a printer enable command (118A) and then waits for the end of print (120B). When it receives the end of print event, it again waits for the reception (114). If the received mail is ordinary mail, the next message received is a body text of the message. Thus, after the message analysis, the program G0 issues a body text display command and a printer enable command (117B, 118B) and then waits for the end of print. If the received mail is of a type which requires the insertion of the ID card to display the body text, such as registered mail or personal mail, an ID request message is received following the mail header. Accordingly, as a result of the message analysis, the program G0 issues a command to display an ID card insertion guidance message on the guide area of the display screen (117D) as shown in FIG. 7F, issues an ID input request command (118D) and then waits for the ID input (120D). When it receives the end of ID input event (121D), it issues an ID input stop command (122D), a receiver's ID display command (123D) and an ID transmission request (124D), and then it waits for the reception.

When the received message is the guide message as a result of the message analysis (116), blocks 117H and 118H in FIG. 7G are executed to issue the received message display command and the ACK send-out command, respectively.

The mailing unit 6 at the central station which exchanges the messages with the terminal equipments 2 (2a, 2b, ...) is now explained.

Figure 8:
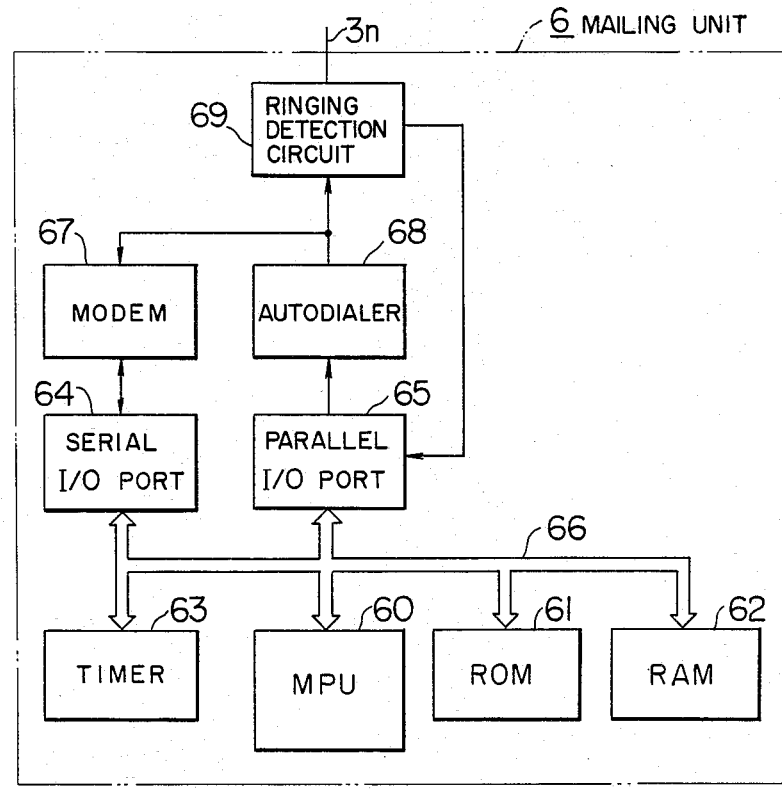
FIG. 8 shows a block diagram of a configuration of a mailing unit 6.

As shown in FIG. 8, the mailing unit 6 comprises a microprocessor 60, a ROM 61, a RAM 62, a timer 63, a serial I/O port 64, a parallel I/O port 65 and an information bus interconnecting those units. The serial I/O port 64 is connected to a MODEM 67 and the parallel I/O port 65 is connected to an auto-dialer 68. A ringing detection circuit 69 is connected to a telephone line $3n$ to automatically detect ringing by the terminal equipment and inform the processor 60 of this event.

Figure 9:
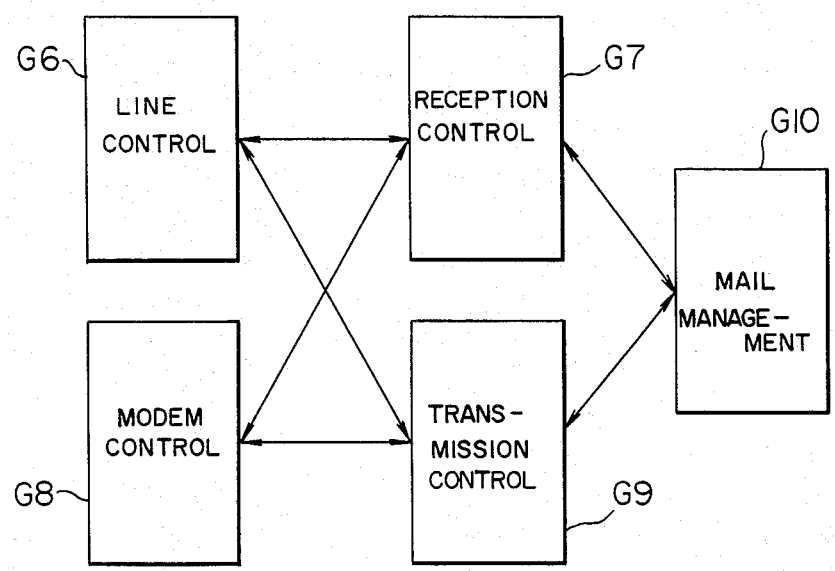
FIG. 9 shows a block diagram of a configuration of major program blocks for controlling the operation of the mailing unit 6.

Referring to FIG. 9, a program for controlling the operation of the mailing unit 6 is a status transition program which comprises a line control group G6 which detects a ringing signal when the terminal equipment calls and activates the auto-dialer to send out an off-hook signal, a dial pulse and an on-hook signal, a modem control group G8 for controlling the MODEM 67, a reception control group G7 for controlling the message reception from the terminal equipment, a transmission control group G9 for controlling the message transmission to the terminal equipment and a mail management group G10 for managing the messages to be transmitted.

The operation of the mailing unit is briefed below.

1. Message Reception from the Terminal Equipment:

When the mailing unit 6 is dialed by the terminal equipment 2, the ringing detection circuit 69 detects the ringing signal sent from the exchanger (network control circuit) 5 and it sends an off-hook signal to the exchanger. After the line has been connected, the mailing unit 6 sends a polling signal of message transmission request TRM to the terminal equipment 2, and when it receives the message from the terminal equipment 2 it checks the content. The received message is classified to a mail which is to be transferred from the mailing unit to other terminal equipment and an injury which request a reply to the sending terminal equipment. In any case, the items of the message are checked and it is determined if the message is acceptable. For the mail message, if it is acceptable, an end of acceptance message including accepted date/time is sent back to the sending terminal equipment. If the transmission is disabled by line trouble before the end of acceptance message is sent back, the accepted mail data is deleted from a mail managing table. For the inquiry message, if the check is OK, the necessary mail is taken out of a mail box and it is sent to the terminal equipment. After those procedures, an end message is sent to the sending terminal equipment and then an on-hook signal is generated to disconnect the telephone line. When the response from the terminal equipment is interrupted for longer than a predetermined time interval during the message transmission/reception, it is handled as a non-response and the end message is transmitted and the telephone line is disconnected.

2. Mail Transmission to the Terminal Equipment:

When mail sent out from one terminal equipment is to be transmitted to another terminal equipment specified by an address, the mailing unit generates the off-hook signal by the auto-dialer 68 and then generates the dialing pulse corresponding to the telephone number of the addressee's terminal equipment. While the line is connected and the terminal equipment is being called, the mailing unit sends out a polling signal of reception request ORG and waits for a response from the terminal equipment, that is, a first ACK signal. If the response is not received from the terminal equipment in a predetermined time interval, the mailing unit registers the mail to be transmitted in a mail box for each address and handles it as recall mail. If the response is received from the terminal equipment, the mailing unit first transmits the mail header, and when it receives a second ACK signal from the terminal equipment, it transmit the body text. If the second ACK signal is not received, the mail is handled as recall mail. If the mail to be transmitted is of a type which requires the receiver's ID input such as registered mail or personal mail, the mailing unit sends an ID input request message prior to the transmission of the body text, and when it receives the ID from the terminal equipment, it transmits the body text. If the predetermined ID is not received, the mail is handled as reserve mail and registered in the mail box. The procedure for ending the mail transmission is similar to that of the mail reception. If a plurality of messages to the same address are present in the mail box, the reception of the body text of one message by the terminal equipment is checked, and after it has been confirmed, the transmission of the next message is started. In this manner, the messages are serially transmitted during one connection of the telephone line.

3. Mail Management:

Of the mails accepted, those having delivery date/time specifications are time-controlled to transmit them to the addressees at the specified date/time. For the mail having a multi-address mail specification, as many messages as the specified number are prepared and they are transmitted to the respective addressee. When an abbreviation of multi-address is used as the address, an abbreviation table is referenced to convert it the respective addresses it is to be delivered to and the mails of the same content are transmitted to the respective addresses.

When the registered mail or the registered personal mail has been transmitted to the addressee, a receipt message including the receiver's ID is prepared and it is sent to the sender. For a delivery certification mail, a certification message indicating the completion of transmission is prepared after the transmission to the addressee has been completed and it is sent to the sender. The messages registered in the mail boxes as recall mails or the reserve mails are outputted when the receivers request to receive the messages.

Figure 11A:
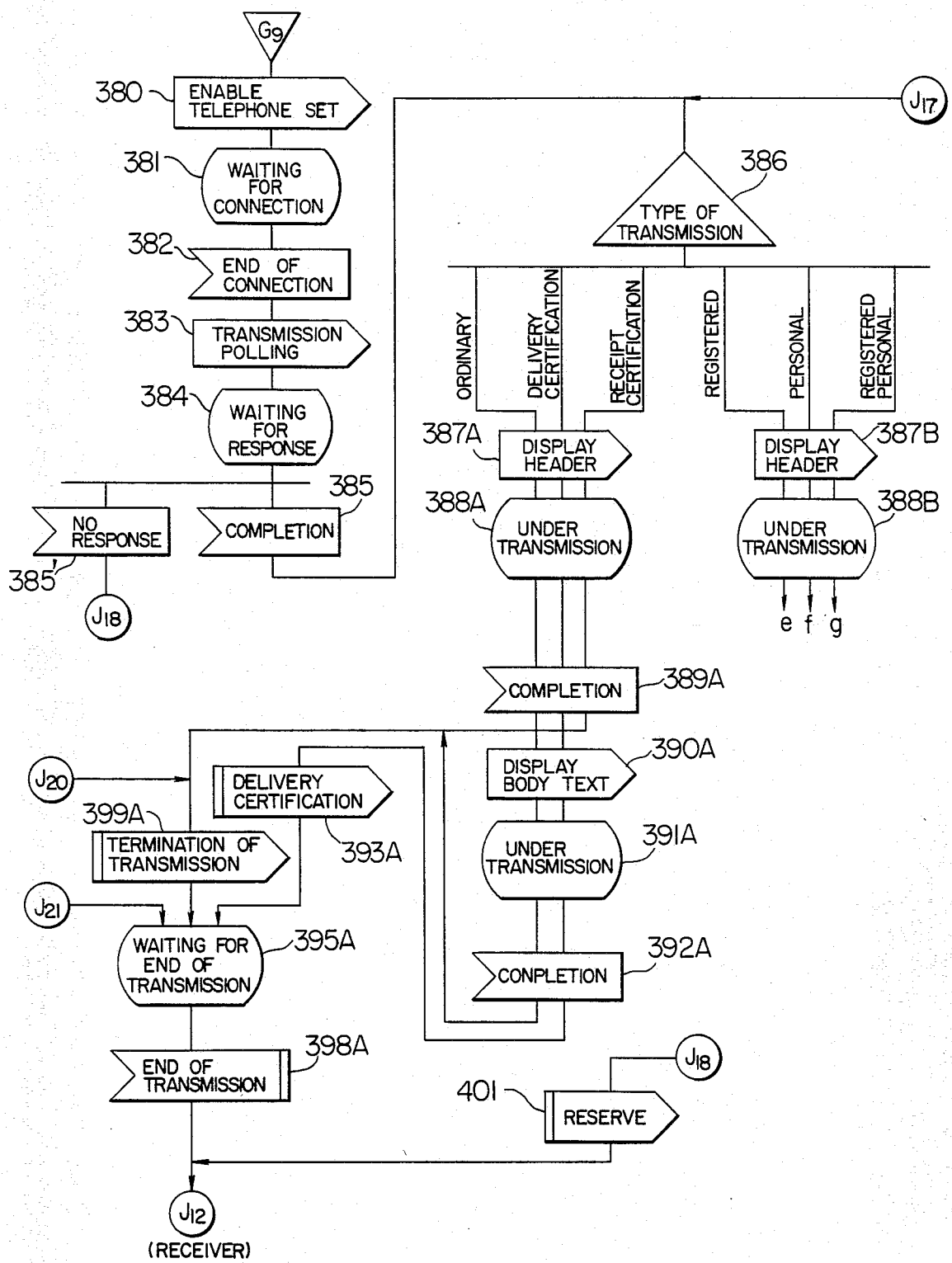

Referring to FIGS. 10-12, a detail of the status transition program for the mailing unit is now explained.

FIGS. 10A-10C show a flow of the program of the reception control group G7. After the execution of a line release routine (330), the program G7 waits for a ringing command from the line control program G6 (331). If it receives a transmission command from the mail management program G10 (332') it execute the transmission control program.

If it receives the ringing command (332), it analyzes the ringing signal (333) and issues a line connection command to the line control program G6 (334). After the line connection (336), it issues a reception polling command (337), and when it receives a message (339), it analyzes the message (340). If the received message is ordinary mail, personal mail, registered mail or delivery certification mail, the program G7 issues commands for checking the message depending on the type of mail as shown in blocks 341A-341C to the mail managing program and waits for the check result (342). If an acceptance event is received as a result of the check (343A), the program G7 issues an end of acceptance command to the MODEM control program G8 (344A), and when it receives the end event from the MODEM (346A), it issues an end of acceptance command to the mail managing program (347A), and if it receives a nonresponse event from the MODEM (346A'), it issues a deletion command to the mail management program (347A') and starts a mail clearing routine (348A'). On the other hand, if it receives an error command from the mail managing program G10 (343B) under the waiting state (342) for the message check, it issues a error display command to the MODEM control program G8 (344B) and after it receives the end event or the non-response event from the program G8, it starts the mail clearing routine (346B, 346B', 347B). After the execution of those routines, it carries out steps of disabling the MODEM and disconnecting the line as shown by blocks 349-354.

For taking out the mail, the program G7 issues commands corresponding to the respective messages as shown in blocks 341D and 341E to the mail managing program and then it waits for the result of the message check (342D). If the result is error (343D'), it executes the steps starting from a block 344B, and if it receives the acceptance command (343D), it executes the steps starting from a block 386 in the transmission control program G9.

FIGS. 11A-11D show a detail of the program of the transmission control group G9. The program G9 issues a telephone enable command to the line control program G6 (386), and after the line is connected (382), it issues a send command for the transmission polling to the MODEM control program G8 (383). When the MODEM receives an ACK signal from the terminal equipment and issues an end command, the program G9 receives it (385) and analyzes the type of transmission (386). Depending on the type of message to be transmitted, it issues a message transmission command to the MODEM control program in one of the sequences 387A-395A and 387B-395A.

For ordinary mail and delivery certification mail, the program G9 first transmits the mail header (387A) and then the body text (390A). Thereafter, it issues an end of transmission command for the ordinary mail (394A) and a delivery certification command for the delivery certification mail (393A), to the mail managing program G10, and then it waits for the reception of an end of transmission command or a command for instructing the next mail transmission (395A). If it receives the end of transmission command (398A), it branches to the block 349 of the reception control program G7 to terminate the MODEM operation. If it receives the command for instructing the next mail transmission (396A), it executes a next mail take-out routine (397A) and repeats the sequence starting from the block 386.

On other hand, for the registered mail, private mail or registered private mail, the program G9 first transmits the mail header (387B) and then transmits the guidance message (390B) and the control signal for the ID input request (393B). When it receives the ID reception command from the MODEM control program G8 (395B), it checks the ID (396B) in the case of registered mail and if the check is OK, it issues the body text display command to the MODEM (397B). If an error is included in the ID, it issues a mail box processing command to the mail managing program G10 (397C). For personal mail and registered personal mail, when the program G9 receives the ID reception command, it checks for equality between the ID inputted by the receiver and the ID of the address (396C), and if they are equal it issues the body text display command (397B), and if they are not equal it issues the mail box processing command (397C). When it has issued the mail box processing command, it waits for the end of transmission (395A) and waits for the next command from the mail managing program. When it has issued the body text display command, it waits for the command from the MODEM control program, and when it receives the end command (399B), it issues a receipt preparation command to the mail managing program G10 (400) in the case of the registered mail and registered personal mail and waits for the end of transmission command (395A). In the case of personal mail, after the program G9 has received the end command, it issues the end of transmission command (394A) and waits for the end of transmission command (395A). In those sequences, if the program G9 receives a terminal non-response command from the MODEM control program G8, it issues a reserve command (401) or a restart command (402) and terminates the modem operation.

FIGS. 12A-12F show a detail of the program of the mail managing program G10. When the program G10 receives the message from the terminal equipment, it executes a sequence starting from a block 411A, 411B, 411C, 411E or 411F depending on a command issued by the reception control program G7. During the mail transmission, it executes a sequence starting from a block 411G-411M depending on a command issued by the transmission control program G9.

Figure 12A:
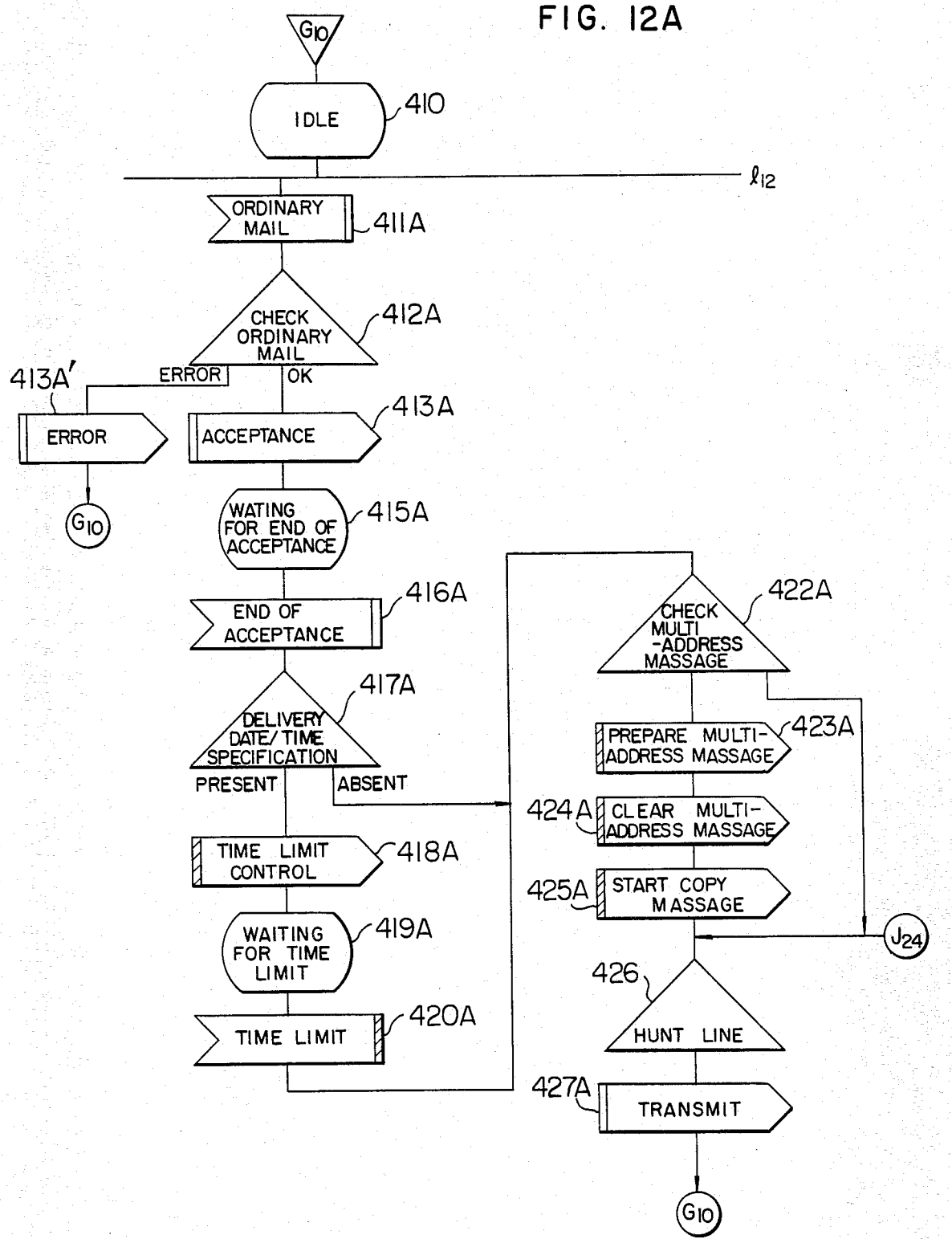
Figure 12B:
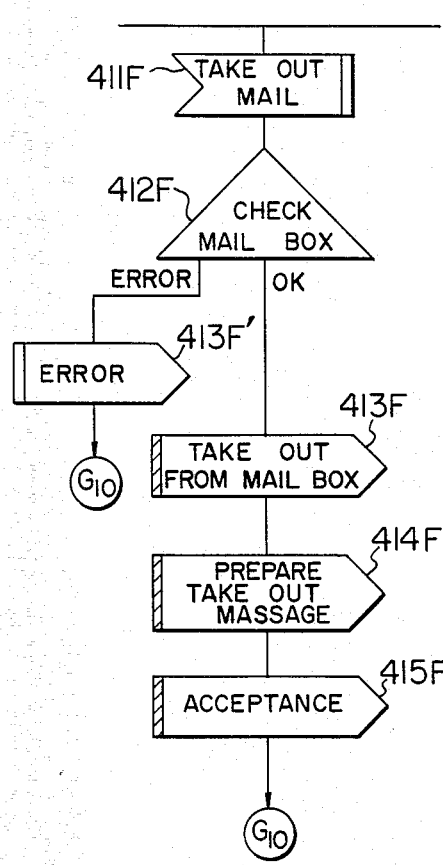
Figure 12D:
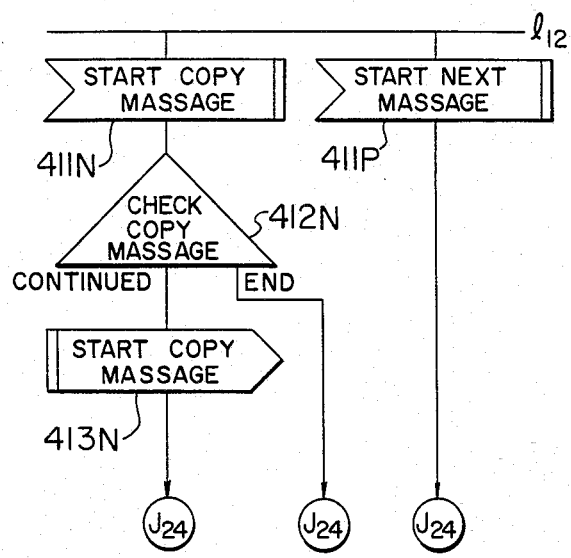
Figure 12E:
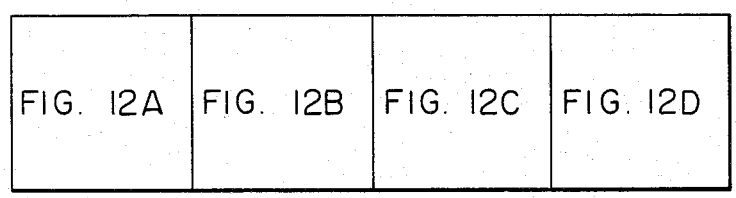
Figure 12C:
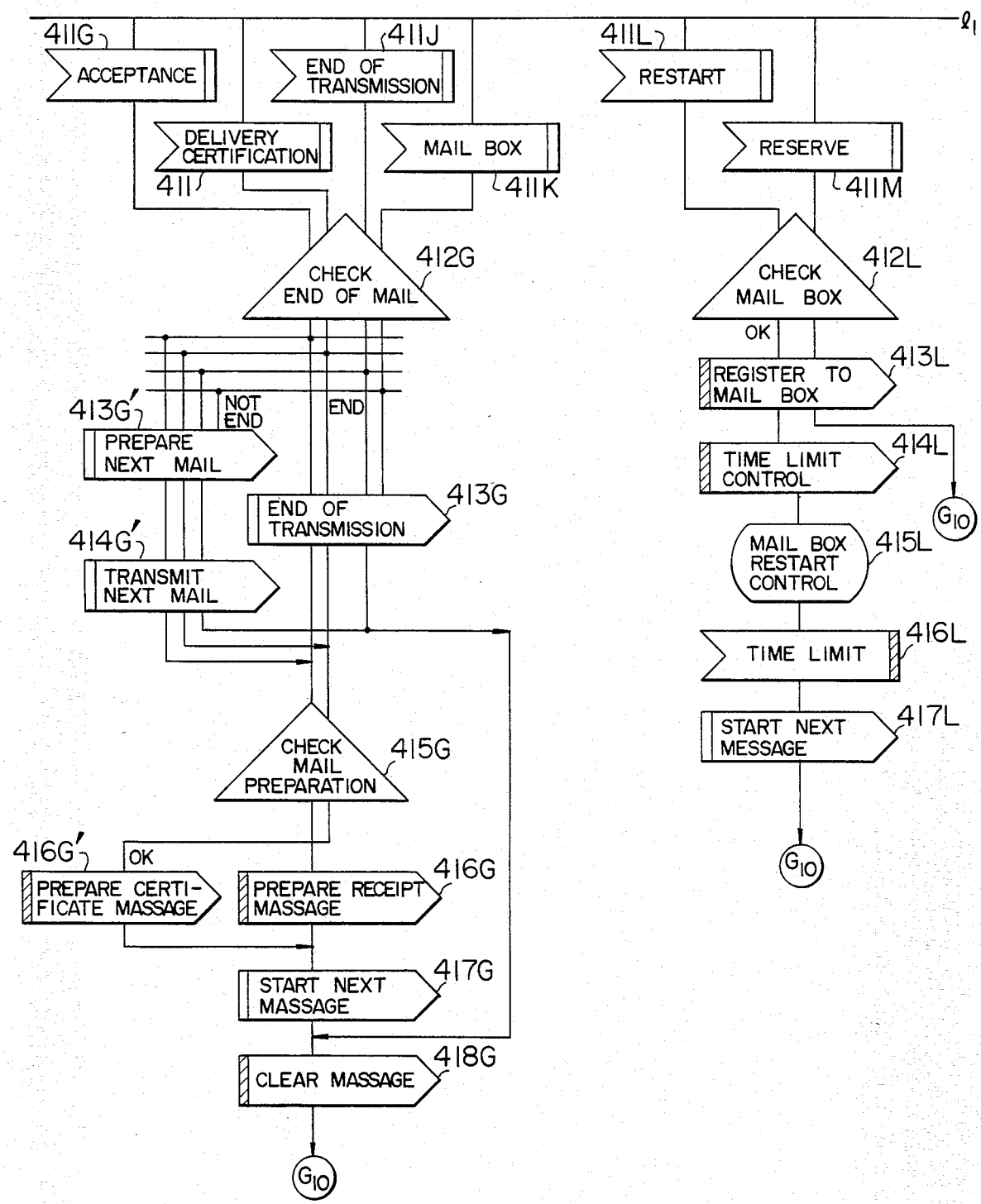

The sequence starting from the block 411A is for ordinary mail which checks the content (412A), and if an error is detected, it issues an error command (413A') and goes back to an initial step, and if no error is detected, it issues an acceptance command (413A) and waits for the end of acceptance (415A). When it receives the end of acceptance command, it checks for the presence or absence of the delivery specification in the case of ordinary mail (417A), and if the delivery specification is present, it execute the mailing time control routine (418A). In the mailing time control routine, date, hour and minute control tables are prepared and tables MCB of the respective mails are linked to those mailing time control tables in accordance with the specified dates/times, and the registrations of the mails are updated in the order of date, hour and minute so that commands informing the arrival of the mailing times are issued when the current time corresponds to the registered dates/times. For the mail whose delivery date/time has elapsed or having the delivery date/time not specified, the program G10 checks to see if it is a multi-address mail (422A), and if it is, it executes a multi-address mail preparation routine (423A). In this routine, a table ALIST which stores addresses is referenced to prepare MCB and TCB for each address. Then, the routine clears the table ALIST (424A) and issues a copy-message start command (425A) and issues a transmission command if a non-busy line is present (426A, 427A). In the case of the single message, the program G10 procedes from the block 422A directly to blocks 426A and 427A. When the copy message start command is issued, a sequence starting from a block 411 in FIG. 12D is executed and the mails are sequentially transmitted through the non-busy line until the copy messages are exhausted. When a next message start command is issued, the message is transmitted in a sequence of blocks 411P, 426A and 427A.

When the program G10 receives a mail take-out command, it checks the status of the mail box (412F), and if the check is OK, it executes blocks 413F and 414F to prepare a take-out message. Then, it issues an acceptance command (415F).

Sequences starting from blocks 411G–411M are for the mail transmission. When the program G10 receives the receipt command (411G), it checks the end of mail transmission (412G) and normally it issues the end of transmission command (413G). Then, it checks the mail preparation condition (415G), and if the check is OK, it prepares a recepit message (416G) and issues the next message start command to transmit the receipt message to the sender of the mail (417G) and clears the data table for the currently transmitted mail (registered mail or registered personal mail) (418G). In the case of delivery certification mail, a similar sequence to that of the receipt message is executed except that a certification message is prepared instead of the receipt message (416G'). When the program G10 receives the end of transmission command (411J), it issues the end of transmission command (413G) and clears the table data for that mail (418G). When it receives the mail box command (411K), it checks the completion of mail (412G), and if the check is OK, it terminates the transmission (413G). A sequence of blocks 413G' and 414G' is a routine which is executed to handle the mail taken out of the mail box.

When the program G10 receives a restart command (411L) or a reserve command (411M), it checks the mail box (412L) and executes a box registration routine (413L). For the restart command, a mailing time control is executed (414L), and when it receives a time limit command issued when a predetermined time interval has elapsed (416L), it issues the next message start command (417L).

As described hereinabove in conjunction with the preferred embodiments, in accordance with the text mailing system of the present invention, the problems encountered in the prior art telephone system are resolved and the present system is particularly effective to the information communication in the office. While the mailing unit having the mail control function is located at the central station and it is called from the terminal equipments to carry out the acceptance and the transmission of the mails in the illustrated embodiments, the function of the mailing unit may be imparted to the data processors at the terminal equipments so that the storage and the automatic transmission of the mails are effected by the respective terminal equipments. To this end, the reception control program G7, the transmission control program G9 and the mail managing program G10 are incorporated in each terminal equipment to control the line control program G1 and the MODEM control program G2 of each terminal equipment. In this case, since the mail can be accepted without the telephone line, the program flow charts shown in the embodiments should be slightly modified. Such a modification may be readily done by those skilled in the art. When the respective terminal equipments are imparted with the mail control functions, the key TM of the terminal equipment shown in FIG. 2 is not necessary, and instead a send key for starting the message transmission is required. The key TXT is used exclusively for the reception. In order to prevent the mail information stored in the terminal equipments from being lost, the RAM 22 must be a non-volatile memory or it must be backed up by a battery.

We claim:
1. A text mailing system comprising:
a plurality of terminal equipments each connected with a telephone set to a telephone line and including means for inputting and outputting a data message on the telephone line, said message including addressee identification information and message text data; and
mail control means connected to a telephone line for receiving messages from said plurality of terminal equipments through an exchanger and for transmitting the received messages to the terminal equipments specified by the addressee identification information in the messages through said exchanger;
said plurality of terminal equipments each having identification input means for inputting addressee identification information; and
said mail control means including means for transmitting a received message to the terminal equipment indicated in the addressee identification information of the received message on the condition that the addressee identification information inputted at said indicated terminal equipment corresponds to the addressee identification information in the received message for a specified type of message.

2. A text mailing system according to claim 1 wherein each of said terminal equipments includes data input means for inputting the message information, said data input means having type of message designation keys and character keys, display means for displaying input information and a received message, means for ouputting a hard copy of the message information, a MODEM, switching means for selectively connecting said telephone set or said MODEM to a telephone line and data processing means connected to said input means, said display means, said outputting means, said MODEM and said switching means to control the operations thereof in a predetermined sequence.

3. A test mailing system according to claim 1, wherein each terminal equipment includes data input means for inputting message information including the specified type of message to be outputted and means responsive to said data input means for outputting a message on said telephone line; said mail control means including means responsive to receipt of a message of a certain specified type for transmitting to the terminal equipment indicated by the addressee identification information of the received message a message in which the message text data of the received message is replaced by a request for input of addressee identification information at the indicated terminal equipment.

4. A text mailing system according to claim 3, wherein each terminal equipment includes means connected to said identification input means for transmitting inputted addressee identification information to said mail control means in response to said request received from said mail control means.

5. A text mailing system according to claim 1, wherein said mail control means includes means for storing messages according to the addressee identification information, and means responsive to recepit of a message which includes a request for transmission of stored messages for transmitting to the terminal equipment indicated by said message any messages stored in said storing means having addressee identification information designating said terminal equipment.

6. A text mailing system according to claim 1, wherein each terminal equipment includes data input means for inputting message information including a desired time of delivery for the message and means responsive to said data input means for outputting a message on said telephone line; said mail control means including means responsive to the specified desired time of delivering in a received message for storing messages which are not to be transmitted to a terminal equipment at the time received in said mail control means and for transmitting stored messages at the time designated by the message.

7. A text mailing system according to claim 1, wherein said identification input means is a magnetic card reader.

8. A text mailing system for mailing information through a telephone network comprising:
  (a) a plurality of terminal equipments each connected to a telephone set for inputting and outputting a message on a telephone line, each of said terminal equipments having means for inputting addressee identification information and a type of said message indicating whether an identification of a receiver for said message is to be certified; and
  (b) mail control means connected to said telephone line for holding therein said message received from said terminal equipments as well as said addressee identification information and said type of message information and for transmitting said message to a terminal equipment specified by said addressed identification information if said type of message information indicates that the message is to be certified and said addressee identification information corresponds to identification data inputted at the specified terminal equipment.

9. A text mailing system according to claim 8, wherein said type of message information inputted at said inputting means includes one of the designations for ordinary mail, registered mail and personal mail and, if said type message is for ordinary mail, said message is transmitted to the specified terminal equipment without identifying the addressee from the terminal equipment to which the message is sent.

10. A text mailing system according to claim 8, said mail control means comprising mail store means for storing a received message if said identification is not certified from the addressee terminal equipment and means for transmitting a stored message in response to inquiry from the addressee terminal equipment as to whether any message is present in said mail store means for that terminal.

* * * * *